United States Patent
Jung

(10) Patent No.: US 7,341,549 B2
(45) Date of Patent: Mar. 11, 2008

(54) DEVICE FOR GRIPPING AND HOLDING A COMPONENT

(75) Inventor: Robert Jung, Pfronten (DE)

(73) Assignee: DECKEL MAHO Pfronten GmbH, Pfronten (DE)

( * ) Notice: Subject to any disclaimer, the term of this patent is extended or adjusted under 35 U.S.C. 154(b) by 207 days.

(21) Appl. No.: 11/350,465

(22) Filed: Feb. 8, 2006

(65) Prior Publication Data

US 2006/0183612 A1  Aug. 17, 2006

(30) Foreign Application Priority Data

Feb. 11, 2005  (DE) .................. 10 2005 006 398

(51) Int. Cl.
*B23Q 3/157* (2006.01)

(52) U.S. Cl. .................. 483/59; 483/67; 483/68; 483/902; 294/99.1

(58) Field of Classification Search .............. 483/902, 483/59, 66–68; 294/99.1; 211/1.56, 1.52, 211/70.6, 69
See application file for complete search history.

(56) References Cited

U.S. PATENT DOCUMENTS 4,858,980 A  8/1989  Dreisig et al.
4,878,705 A  * 11/1989  Arnquist ................ 294/116
5,267,766 A  12/1993  Geissler
5,277,689 A  * 1/1994  Ruetschle et al. ........... 483/36
5,476,436 A  * 12/1995  Klicpera ................... 483/68

FOREIGN PATENT DOCUMENTS

| DE | G 9111 159.5 | 12/1991 |
|---|---|---|
| DE | G 93 07 544.8 | 12/1993 |
| DE | 196 51 277 A1 | 6/1998 |
| DE | 101 63 294 A1 | 7/2003 |
| FR | 2 284 410 A1 | 4/1976 |

OTHER PUBLICATIONS

Machine translation of the description of FR 2284410, 9 pages.*

* cited by examiner

*Primary Examiner*—Erica Cadugan
(74) *Attorney, Agent, or Firm*—The Maxham Firm

(57) ABSTRACT

A gripping and holding device in the handling system of a machine tool. The device comprises at least one preferably plate-like support member provided with at least two retainer fingers spreadable against a return force and defining a common accommodation orifice for a component to be clamped. At least one resiliently displaceable retainer finger is integrally formed with the support member and can be locked in its clamping position by a locking element.

19 Claims, 8 Drawing Sheets

DEVICE FOR GRIPPING AND HOLDING A COMPONENT

BACKGROUND

1. Field of the Invention

The invention generally relates to a device for gripping and holding a component, and in particular, to a tool in the handling system of a machine tool.

2. Background Discussion

In program controlled machine tools and machining centers, different types of handling systems are used. On the one hand, some handling systems provide for the organized supply of certain workpieces to the work area of the machine and, on the other hand, systems may provide for the automated exchange of tools from a tool storage in the machining unit of the machine.

In the known tool storages for complex processing machines there are, among others, chain magazines, disk magazines, and shelf magazines in different embodiments. What all tool magazines have in common is a plurality of tool accommodations into which the tool cones of various processing tools are inserted in predetermined positions. Individual tools are taken from the magazines and inserted into and extracted from the processing unit by a motor-driven tool changing device in accordance with a predetermined processing program of the machine.

From German patent 101 63 294, a handling system for program-controlled milling and drilling machines is known which comprises a chain tool magazine disposed adjacent to the machine tool and a tool changing device carrying a gripper movable in a plurality of axes and comprising grapples which are angularly displaced with respect to each other. One grapple is intended to accommodate a used tool from the work spindle and a second grapple is intended to insert a new tool into the work spindle, respectively. On each chain link the vertical chain magazine comprises a tool accommodation, the accommodation aperture of which is defined by two radially protruding, rigid retainer fingers. At least one of the retainer fingers is attached to the associated chain link via a joint so that it is displaced against the force of a built-in spring during the insertion and extraction of a tool cone.

German patent 196 51 277 is directed to a disk magazine disposed next to the stand of a milling and drilling machine, the circular magazine disk of which is provided with clamp-like tool accommodations in regular intervals at its outer circumference. Above each tool accommodation an upper spring shackle is provided which exerts a downward acting force acting on the ring-shaped collar of an upwardly protruding tool cone and pushes the ring-shaped collar against the respective clamp-like tool accommodation. Each spring shackle comprises one soft elastic and one rigid retainer finger. The pressing force of the spring shackles, however, is insufficient to prevent the tools accommodated in the tool accommodations from falling out, even in case of high starting accelerations or braking decelerations. This known handling system comprises a tool changing device carrying a so-called double gripper on the free end of a swivel arm. The two grippers are displaced in right angles with respect to each other and comprise two gripping or retainer fingers, respectively, which define a central accommodation orifice. Both retainer fingers of each gripper are linked to a main body so as to be displaceable about a tappet and can be locked in their closed position against the spring force by a respective locking member. Due to the number of components, the tool accommodations of the magazine disk and the grippers of the tool changing device, respectively, require considerable technical expenditures.

German patent publication 42 15 697 A describes a tool changing device comprising two parallel grippers disposed on an arm which respectively form a tool accommodation. The grippers are linked to the arm so as to be rotatable about a transverse axis and comprise two rigid jaws surrounding a recess, one of the jaws being rigid and the other pivotable against the spring force in a joint. The resulting spreading of both jaws allows the insertion of a standardized tool holder into the tool accommodation. Due to the number of individual components the grippers are technically complex and susceptible to failure. A similar tool gripper comprising two gripping jaws pivotable with respect to each other is known from the German publication OS 37 17 201. An operating element causing the two gripper jaws to be spread or closed is moved by a thrust block fixedly mounted on the machine. This gripper is also particularly complex in design.

European application EP 0 355 271 A describes a tool gripper for a tool handling system of a machine tool comprising a plate-like support member provided with two elastically spreadable jaws or retainer fingers defining a common accommodation orifice for the tool cone to be clamped. The support plate comprising the integrally formed retainer fingers is integrally formed of a technical plastic, for example, of an acetal resin. To prevent the clamped tools from unintentionally disengaging, for example, when starting or braking a chain magazine, the disengagement force for extracting a tool from an accommodation orifice should be considerably larger than the insertion force. For this purpose a plurality of integrated resilient bridges are respectively formed as laminated springs between parallel slots in the bottom section of the accommodation orifice in the support plate made of synthetic resin. The laminated springs and the slots extend transverse to the jaws or the longitudinal axis of the gripper and have a low spring constant in the transverse direction as well as a relatively high spring constant in the longitudinal direction. Due to the material properties of the support plate used and the design and arrangement of the integrated laminated springs, this gripper is unsuitable for handling heavy tools.

SUMMARY OF THE INVENTION

It is a purpose of the invention to provide a gripping and holding device for the handling system of a machine tool which is technically simple and cost effective in design and grants a secure attachment of the clamped component.

The above purpose of the invention is provided by the feature that at least one resiliently displaceable retainer finger is integrally formed with the support member and lockable in its clamping position by means of an adjustable locking element.

The integral design and the connection of the retainer finger to the support member renders the separate spring elements provided in known tool accommodations and grippers superfluous whereby the manufacturing expenses are considerably reduced. An unintentional disengagement of the tools from the respective tool accommodations, for example, due to shock-like loads, high starting accelerations, or braking decelerations, can be prevented with high security and in a simple manner by shifting a locking member from a stand-by position to a locked position in which the spring action of the retainer finger is cancelled and the retainer finger itself is immovably locked in its clamping position.

In the device according to an embodiment of the invention, the support member may have a shape and size suitable for the respective use and be formed resiliently integrated with one or more retainer fingers. For grippers of tool changing devices and for tool accommodations of disc, shelf, or chain magazines, production and design related advantages arise if the respective support member is formed as a rigid support plate made of steel on which the retainer fingers of the tool accommodations are integrally formed. The most suitable contour of the support plates may be obtained by suitable cutting operations, particularly by stamping, nippling, or laser cutting, respectively. In one support plate a single or a plurality of tool accommodations may be formed.

An advantageous embodiment of the invention is characterised in that the disk-shaped support member made of highly solid material has at least one, preferably at least two, adjacent slots defining a resilient bridge connected to the displaceable retainer finger where the bridge may comprise at least one spring portion. The slots in the support plate preferably made of steel may be produced by machining or laser cutting in a suitable width, the straight or arcuate course and length of the slots determining the width, rigidity, and elasticity of the bridge as well as the spring characteristics of the retainer finger integrally connected to the bridge. Since the width of one or both of the slots is reduced in certain sections during a lateral displacement of the retainer finger, the spring or biasing action and the possibility of a displacement of the retainer finger may be intentionally excluded if a locking member on which then both side walls of the respective slot section are supported in a compression-proof manner and which therefore prevents a change of the width of the slot section is disposed in this particular section. The locking elements may be provided in various types, for example,. as bolts, pivots, cones, wedges, multiple cornered lock bolts, rotational cams, among others, and movable between a stand-by position and a locked position in the longitudinal or transverse direction or rotatable in case of an asymmetrical cross section.

For the accommodation of the locking member a widened section may be provided in the predetermined slot portion, the shape of which is adjusted to the contour size and the dimensions of the respective locking member. In this manner the insertion of the locking member into its locked position and the movement to its stand-by position are facilitated while the positional accuracy is enhanced. The locking member may also act on the displaceable retainer finger directly and prevent it from spreading.

In a preferred embodiment at least one of the slots unilaterally bordering the rigid bridge and the portion serving as a spring element extends from the base portion of the support member to the accommodation orifice. The second slot may have a transverse portion interrupting the rigid bridge and serving as an accommodation for the locking member.

However, only a single slot unilaterally defining a resilient bridge having a constant or variable cross section may be formed in the support element. The resilient bridge has a suitable spring constant determined by its length and cross section. To keep the spring action of the bridge "soft" so that only minor forces are required to spread the retainer finger associated with the bridge the resilient bridge should have a sufficient length and, at least in parts, a small cross section. The locking member should directly engage with the retainer finger.

The gripping and holding device according to the invention is characterised by its simple design, the low number of movable components and its cost-effective production as compared to other comparable gripping and holding devices. The integration of a spring element into the support element, preferably its base portion, as well as the integral construction of the two retainer fingers of each tool accommodation, enable the production of this integrated assembly with simple cutting operations, for example, by means of a laser beam. The; assembly work is limited to the attachment of the locking members to the support members and the attachment of the adjustment mechanism on a machine part.

The locking member is highly effective since the elastic action of the spring portion is cancelled by shifting it into its locked position and a per se highly rigid integral component consisting of the support member and the retainer fingers is formed. It is further advantageous that the position of the spring portion in the support member can be freely selected over a wide range. When the spring portion is disposed in the base portion of the support member a relatively large free space between the spring portion and the tool accommodation is obtained. The same applies to the positioning of the slot portion designed to accommodate the locking member and suitably extending transversely. Due to this transverse direction the moments acting on the displaceable retainer finger are applied to a rigid area of the support member as pure pressure forces via the locking member disposed in its supporting position.

Even though the position of the spring portion and the one slot portion for accommodating the locking member is not limited to the rear portion of the support member, this design is advantageous for tool changing devices and disk magazines in that no additional components are required in the proximity of the tool accommodations and the retainer fingers which might affect the insertion or extraction of a tool cone.

The technical concept on which the invention is based can be applied to grippers of manipulators and tool changing devices. Further the gripping and holding devices according to the invention may be used in tool magazines, that is, in chain, disk, and shelf magazines. When the device according to the invention is used for a disk magazine, plate-like support members form the conventionally driven magazine disk and a plurality of circle segment-shaped support plates may be assembled to form a continuous magazine disk. On the outer circumference of the circular, plate-like magazine disk are disposed the tool accommodations comprising the resiliently displaceable retainer fingers lockable by a respective locking member. Both fingers of each accommodation are an integral component of the support plate.

The gripping and holding devices according to the invention are particularly suitable for shelf magazines in which the individual shelves or their compartments can be shifted or rotated about their normal axes. In these cases, too, it is advantageous to fix the plurality of different tools in their respective accommodations so that they will not become disengaged from their accommodations and damage other components when the shelves or parts of the shelves are moved.

If the gripping and holding device according to the invention is used in connection with a chain magazine the respective locking member may act on the free end portion of the spreadable retainer finger. In this case the locking member is preferably formed as a pin disposed in the hollow tappet of the chain link so as to be axially shiftable. In case of a fluidic, electromagnetic, or mechanic actuator unit the pin can be axially moved within the hollow tappet so that its possibly tapered end engages with or is released from a correspondingly shaped recess in the retainer finger.

The tool accommodations are preferably disposed in the tool magazine adjacent to each other so that the rigid retainer finger of one tool accommodation is opposed to the resiliently displaceable retainer finger of the adjacent tool accommodation. The distance between the retainer fingers should be selected so that the resilient retainer finger is supported by the rigid retainer finger in the displaced state so that the distance of its displacement and the stress acting on it are limited.

BRIEF DESCRIPTION OF THE DRAWING

The objects, features, and advantages of the gripping and holding device according to the invention will be more clearly perceived from the following detailed description, when read in conjunction with the accompanying drawing, in which.

DETAILED DESCRIPTION OF THE PREFERRED EMBODIMENTS

Figure 1:
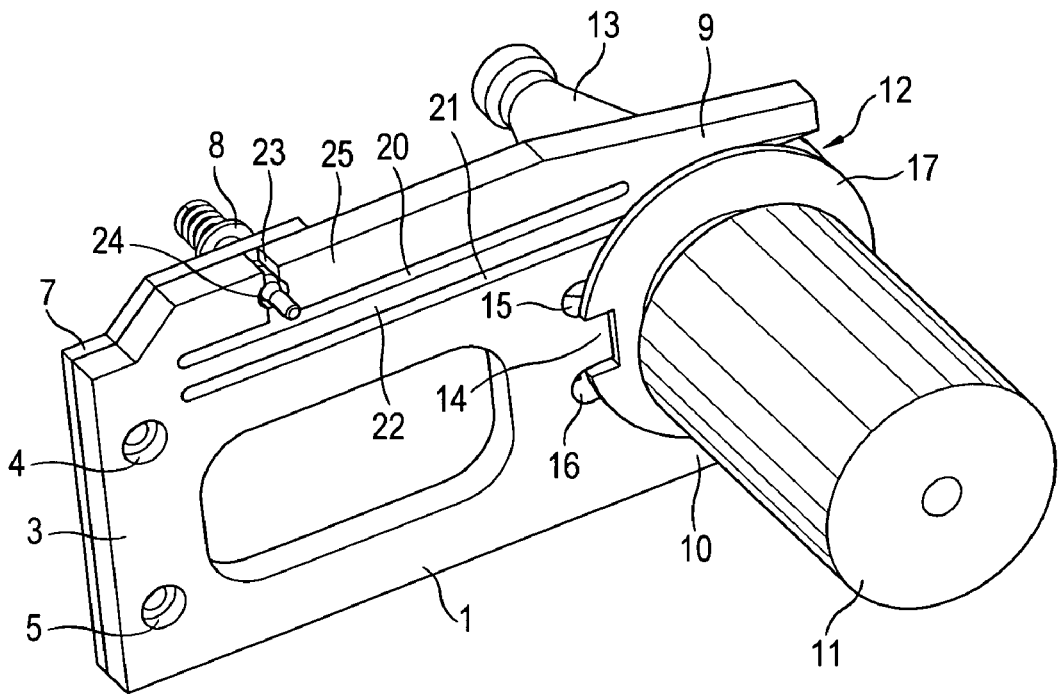
FIG. 1 is a perspective view of a gripping and holding device according to the invention.

The gripping and holding device of the invention may be used for the grippers of a tool changing device and, in plurality, as tool carriers for tool magazines. The design of the device, of which only exemplary embodiments are shown in the drawing figures, can be modified depending on the intended use.

With reference now to the drawing, FIG. 1 shows support member 1 formed as a nearly or generally rectangular steel plate having a thickness of about 10 mm, for example. In tapered base portion 3 of the support plate, two die-sunk bores 4, 5 are formed in predetermined intervals which are intended to accommodate fastening bolts by which support plate 1 is fixed to a suitable component of a tool changing device. An example of such a component 6 is schematically and partially shown in FIG. 2.

On the rear side of base portion 3 of the support plate is thinner plate 7 which serves as support for adjustable locking member 8. To reduce the weight an almost or generally rectangular recess is formed in the central portion of support plate 1. On the right end (FIG. 1) portion of the support plate are two retainer fingers 9, 10 integrally formed. Upper retainer finger 9 is formed so as to be elastically displaceable against a resilient force when tool cone 13 is inserted into or extracted from accommodation orifice 12. Lower retainer finger 10, partly covered by tool 11, is massive, or rigid, and its position cannot be changed. The two retainer fingers define the more than semicircular accommodation orifice 12 in which ring-shaped collar 17 of tool cone 13 of tool 11 is held. To secure the position of the tool cone both retainer fingers 9, 10 are provided with a nose on the distal end and wedge-shaped inner flanks engaging with the circumferential groove in ring-shaped collar 17. To further secure the position of tool cone 13 in accommodation orifice 12, nose 14 is formed on the support plate and is provided in the bottom portion of accommodation orifice 12. Nose 14 is defined by semicircular recesses 15, 16 on both sides and engaging with a recess in ring-shaped collar 17. The size of accommodation orifice 12 is set in accordance with the diameter of the circumferential groove in the ring-shaped collar so that tool cone 13 is held in a biased state by retainer fingers 9, 10.

With further reference to FIG. 1, in the upper part of support plate 1 are two parallel slots 20, 21 which extend in the longitudinal direction and define bridge 22 between them. Inner slot 21 extends from base portion 3 to accommodation orifice 12 and has a constant width. Outer slot 20 is formed as a blind slot on both ends and also extends from base portion 3 of the support plate to the base of retainer finger 9. Laterally freely terminating, short, transverse slot 23 is provided with a widened section 24 in which the locking member 8, shiftable in the axial direction, is received. Slot 23 branches from the rear portion of outer slot 20. In this embodiment, bridge 22 has a constant cross section and forms a spring element enabling a lateral spreading motion of retainer finger 9. Bridge 22 may also have a variable cross section across its length whereby its spring action is correspondingly varied.

The function and operation of the device described above are as follows.

A component to be clamped and held, in this case tool cone 13 including tool 11, is laterally moved by either a transverse movement of the tool cone or a longitudinal movement of support plate 1. Upper retainer finger 9 is thereby pivoted upwardly against the bias or spring action of bridge 22 by the curvature of ring-shaped collar 17 formed on the tool cone, until the tool cone or its ring-shaped collar has reached the final position in accommodation orifice 12 as shown in FIG. 1. In that final position upper retainer finger 9 has elastically returned to the position shown. The spring action required for the displacement of retainer finger 9 and its automatic return movement is enabled by elongated bridge 22 which forms a spring element over its entire length. To enable retainer finger 9 to perform its displacement movement, locking bolt 8 is temporarily shifted into an inactive position in which it is sufficiently loosely seated in or completely removed from widened section 24 of transverse slot 23. This causes the relatively broad outer bridge 25 to lose or substantially reduce its rigidity so that it can be slightly displaced when retainer finger 9 is extended during the insertion or extraction of the tool cone. As soon as tool cone 13 or its ring-shaped collar is in the position shown in FIG. 1, bolt-shaped locking member 8 is axially pushed into widened section 24 in the transverse slot so that the, so far, free right portion of bridge 25 is in a positively supported contact with the remaining part of the bridge. Thereafter displacement or spreading movements of one or the other retainer finger 9, 10 are no longer possible so that tool 11 or its tool cone 13 is secured against disengagement since the ends of the retainer fingers 9, 10 surround the collar 12 over an angular range of more than 180°.

Figure 2:
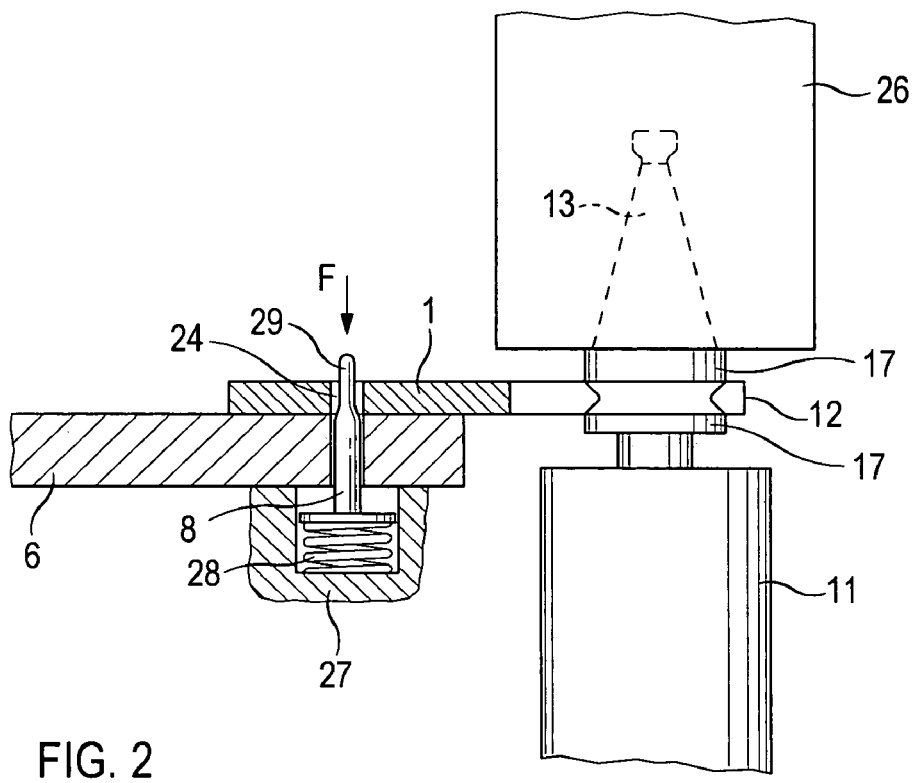
FIG. 2 is a schematic side view of a device according to the invention used as a gripper of a tool changing device including a tool and a work spindle.

A device according to FIG. 1 used for a tool changing device is schematically shown during an exchange operation in FIG. 2. Tool 11 is clamped in work spindle 26 by means of its tool cone 13. Support plate 1, formed approximately in the manner described above, is mounted on support 6, to the bottom side of which is attached housing 27. The housing comprises pressure spring 28 applying a continuous spring force to a base disk of locking bolt 8. The locking bolt 8 extends through a bore formed in the support 6 and comprises a tapered end cone 29.

When tool cone 13 is disposed in tool accommodation orifice 12, or the tool accommodation orifice is empty, spring 28 pushes locking bolt 8 into its locked position in which the thicker bolt shaft fills widened section 24 of transverse slot 23.

With continued reference to FIG. 2, when support 6, with support plate 1 mounted thereon, is moved to the right or work spindle 26 with the tool 11 is moved to the left, or both, a force F pushing locking bolt 8 into the lower position against the bias force of spring 28 is applied to the locking bolt. The locking bolt has been located in its upper locked position before the gripping operation is started. The force F may be generated in different ways, for example, mechanically by wedge surfaces or cams as well as by fluid-driven or electrically driven actuators. As can be seen in FIG. 2, narrow upper tappet 29 of locking bolt 8 is received in widened section 24, the dimensions of which correspond to the thicker bolt shaft with a lateral clearance in this position. The locking effect of bolt 8 is thus cancelled so that associated retainer finger 9 can be resiliently displaced against the resilient force of bridge 22 (FIG. 1) by inserting ring-shaped collar 17. As soon as the ring-shaped collar has reached the position shown in FIG. 1, locking bolt 8 is relieved from the force F and returned into its upper position in which its broader bolt shaft fills widened section 24 and thus locks retainer finger 9 in its locked position by the action of pressure spring 28. To generate the force F various mechanisms such as pressure generating elements, overrunning ramps, cams, among others, may be used which are mounted to the gripper or fixedly disposed.

The gripping and holding devices according to the invention may also be used as tool accommodations in tool magazines which may be disk, shelf or chain magazines.

Figure 3:
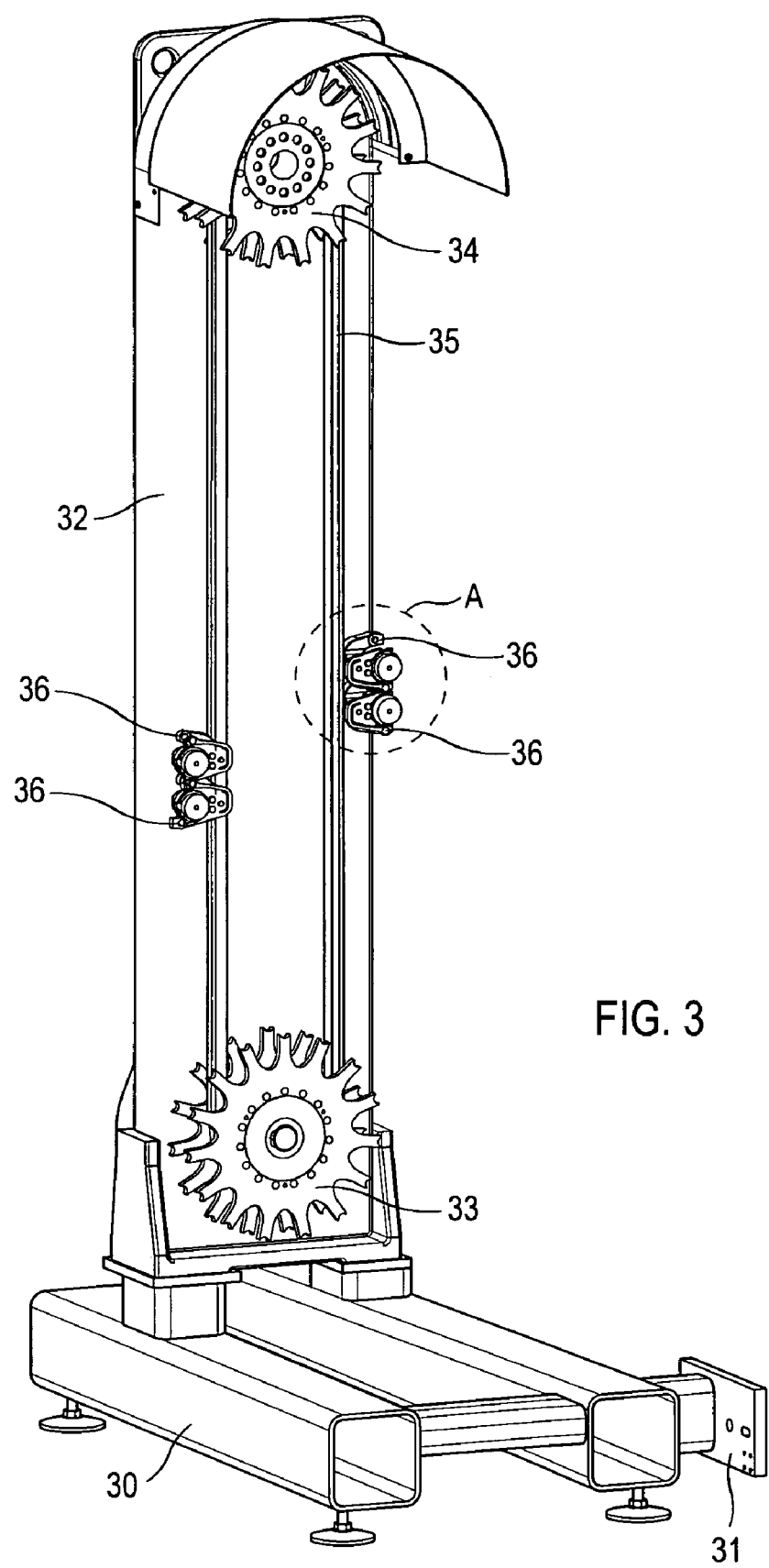
FIG. 3 is an oblique schematic perspective view of a chain magazine comprising the gripping and holding devices according to the invention.
Figure 8:
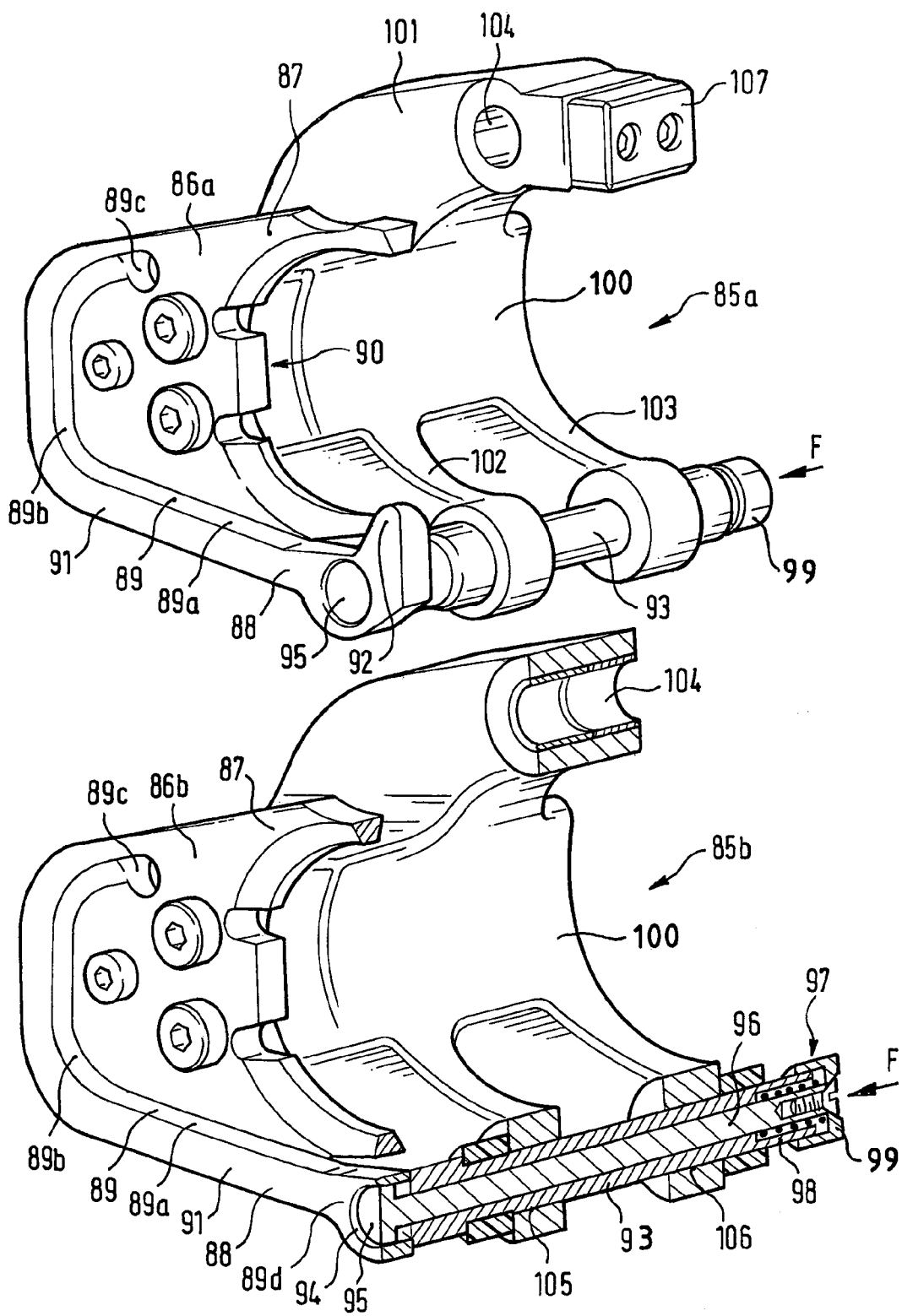
FIG. 8 is a perspective illustration of two links of a chain magazine comprising a gripping and holding device.
Figure 9:
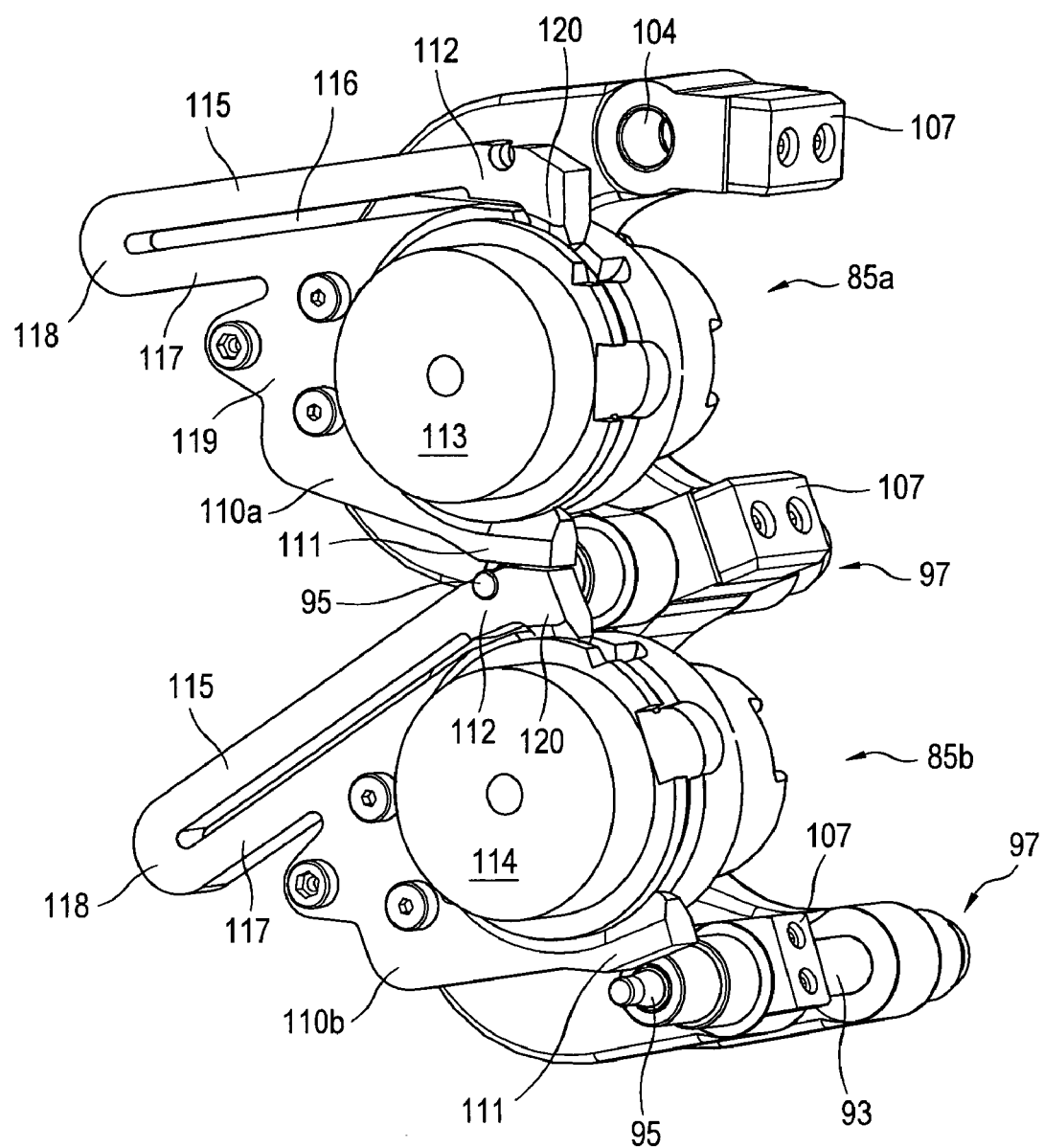
FIG. 9 shows two links of a further chain magazine.

An example of a chain magazine is shown in FIG. 3. The chain links of such a magazine may be designed as shown in FIGS. 8 and 9. The chain magazine comprises a stable base 30 comprising adjustable support feet and struts 31 for the lateral assembly with, for example, a milling machine. On the base is mounted vertical support structure 32, on the stable front side of which are mounted lower and upper sprockets 33, 34. One of the sprockets, 33 or 34, is driven by a drive unit (not shown). A link chain 35, consisting of a plurality of chain links 36 pivotably linked to each other by means of bolts, runs on sprockets 33, 34. FIGS. 8 and 9 show two embodiments of such chain links provided with a device according to the invention.

Figure 4:
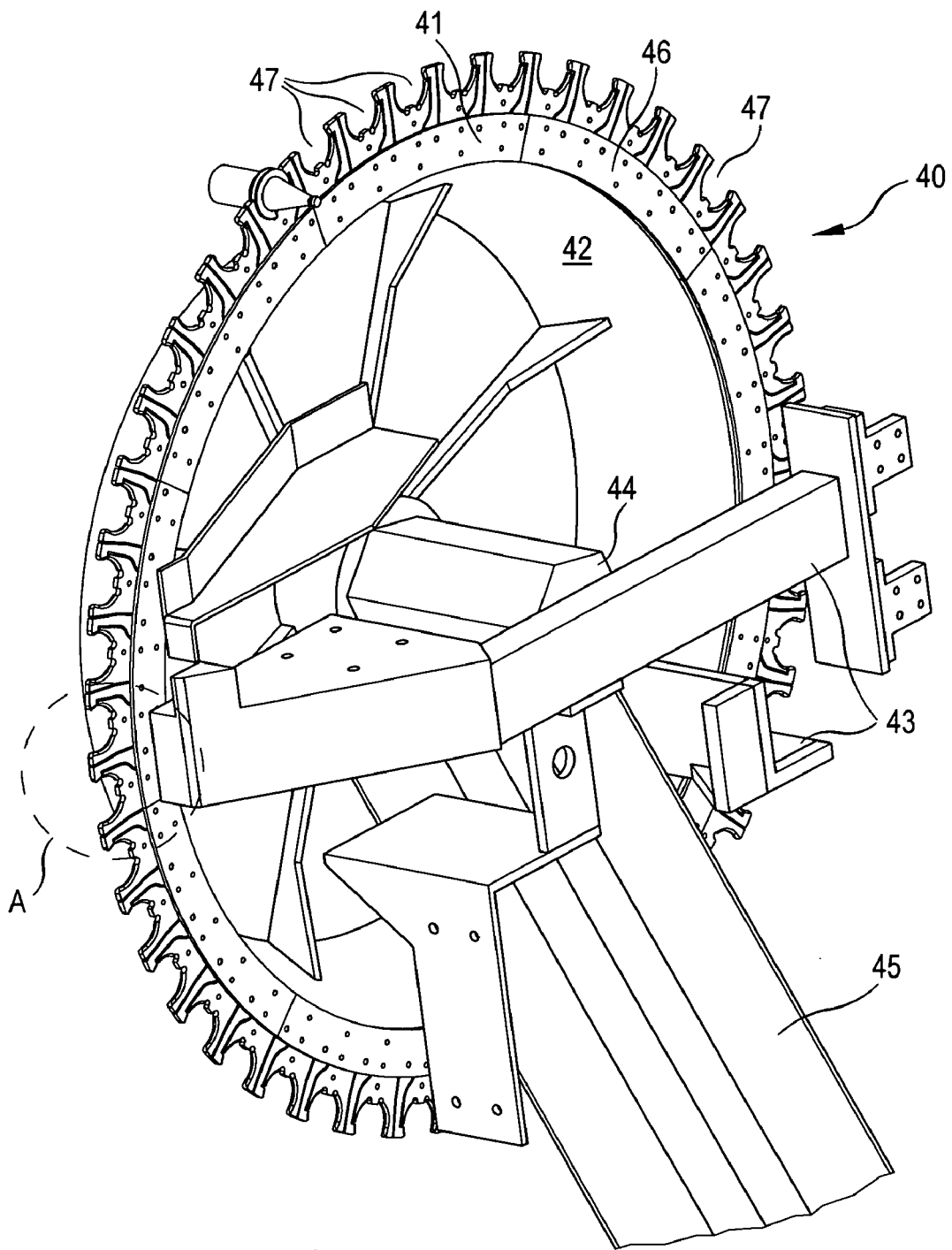
FIG. 4 is an oblique schematic perspective view of a disk magazine comprising the gripping and holding devices according to the invention.

As another example, FIG. 4 shows a vertical disk magazine. Magazine disk 40 is formed as ring-shaped disk 41 rotatably supported in support frame 43 by means of support structure 42 in the form of a hollow cylinder. Support frame 43 contains a drive unit and is supported on inclined column 45. Magazine disk 41 is formed as a ring-shaped disk and is composed of ring segment-shaped support plates 46. Two different embodiments of such support plates will be described in detail with reference to FIGS. 5 and 6. Each circular disk segment 46 comprises a plurality of tool accommodations 47 disposed along its radially outer rim. The tool changing station comprising the locking mechanism is disposed in the encircled sections A in FIGS. 3 and 4. The locking mechanism may have the configuration shown in an enlarged cross sectional view in FIG. 7.

Figure 5:
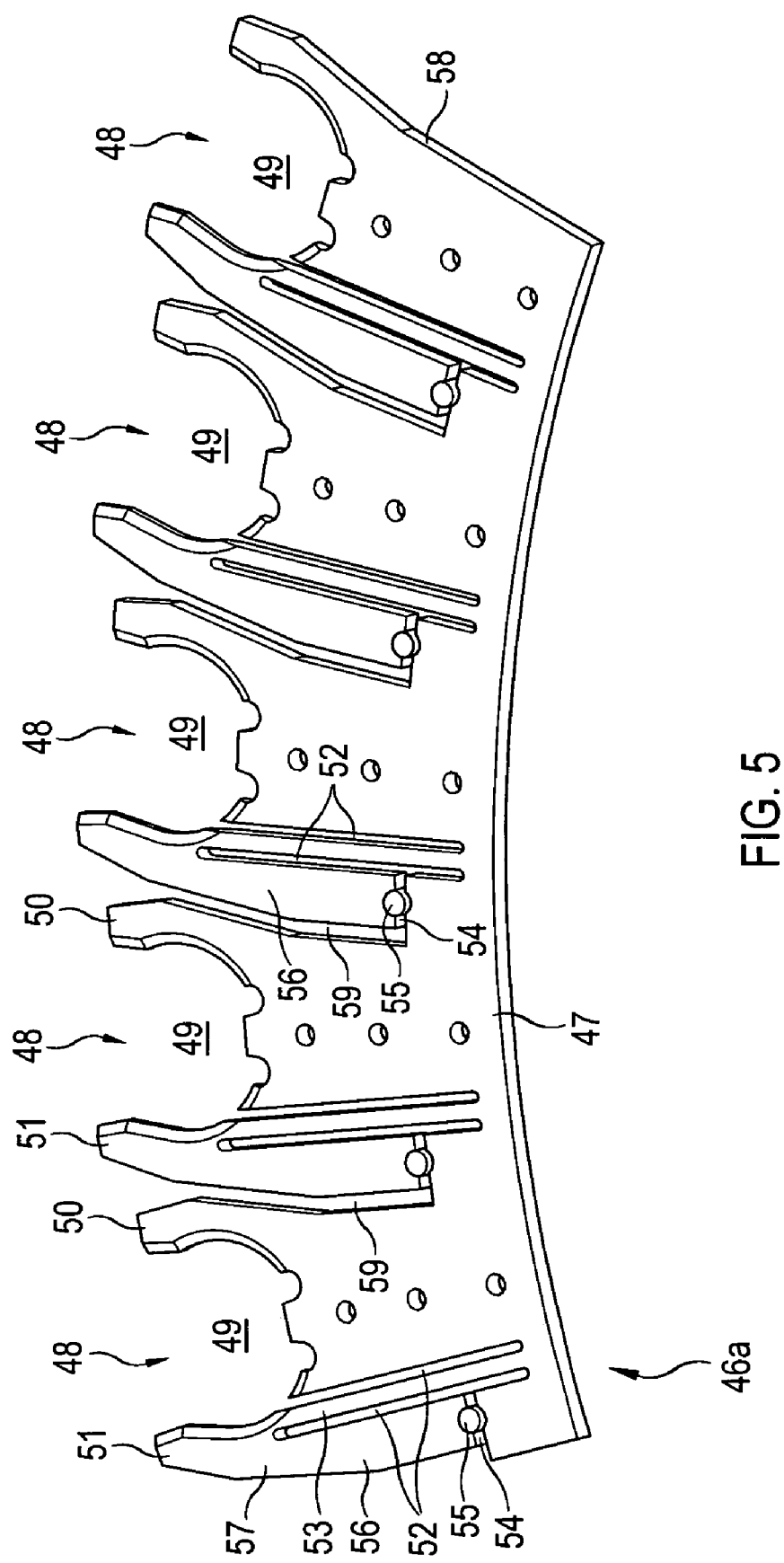
FIG. 5 is a plan view of a circle segment of the disk magazine according to FIG. 3.
Figure 6:
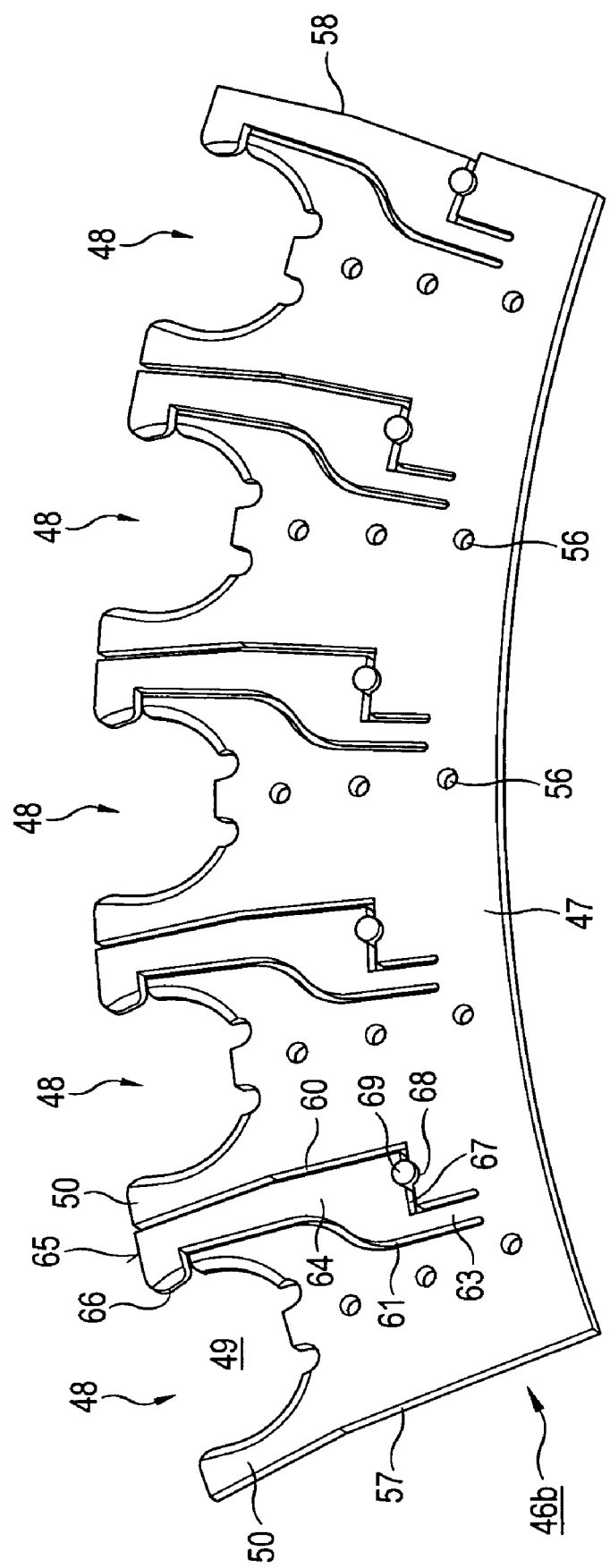
FIG. 6 is another plan view of a further embodiment of the circle segment for the disk magazine according to FIG. 3.

FIGS. 5 and 6 each show plan views of two variations of circular disk segment 46, denoted by reference numerals 46a and 46b. Segment 46a, shown in FIG. 5, is composed of integral, rigid support plate 47 preferably made of steel and having a thickness of about 10 mm, for example. On the radially outer side a total of five identical tool accommodations 48 are provided. Slightly more than semicircular accommodation orifices 49 are defined by, respectively, one rigid retainer finger 50 and one resiliently displaceable retainer finger 51. As can be seen, the construction and therefore the operation of tool accommodations 48 are, to a large extent, identical to those of the gripping and holding device shown in FIG. 1 so that in this respect the above description may be referenced. Each displaceable retainer finger 51 is associated with an elongated resilient bridge 53 defined by two slots 52 extending up to the base portion of the support plate on both sides, resilient bridge 53 forming a spring element. Further, each tool accommodation 48 comprises a transverse slot 54 opening to one of slots 52 and comprising a widened section in which locking bolt 55 is received which may be provided with a cone-shaped end portion. Rigid bridge 56 is defined by slot 59 and is integrally connected to displaceable retainer finger 51. Bridge 56 ends at this transverse slot 54. After: adjustable locking bolt 55 is positioned in its locked position the end surface of bridge 56 is supported by the locking bolt 55.

To mount support plate 47 on a suitable support, three bores for accommodating appropriate bolts are respectively provided for each tool accommodation 48. Lateral edges 57, 58 of each support plate 47 are formed so that a seamless connection to the adjacent support plate is obtained after the assembly.

Circular disk segment 46b shown in FIG. 6 corresponds to the embodiment shown in FIG. 5 to a large extent. Therefore identical components are designated by the reference numbers used in FIG. 5. However, the shape of slots 60, 61 formed in support plate 47, is different. These slots may be formed by suitable means such as by a laser beam or by machining. Slots 60, 61 extend parallel in the radial direction only in their lower sections in the base portion of support plate 47, and define the two sides of resilient bridge 63. The resilient bridge is connected to the material of the support plate on the radially inner side and to a rigid bridge 64, the radially outer end portion of which forms the displaceable retainer finger 65 on the radially distal end. At the end above the termination of slot 61, displaceable retainer finger 65 is provided with curved nose 66. Slot 60 defines the rear end of displaceable retainer finger 65. Bridge 64 is connected to finger 65 and is also connected to short transverse slot 67 in which is formed circular widened section 68 for receiving the adjustable locking bolt 69.

In the embodiment shown in FIG. 6, bridge 63 is the spring element for displaceable retainer finger 65. The extent of the spring action is determined by the width and length of bridge 63. The position of widened section 68 for receiving adjustable locking bolt 69 in transverse slot 67 causes the spreading forces acting on retainer finger 65 in the locked state to be transmitted to support plate 47 via the engaged locking member as pressure forces acting in the longitudinal direction of the respective bridge 64. The embodiment according to FIG. 6 may be produced particularly cost-effectively due to the small number of slots. The provision of resilient bridge 63 in the base portion of support plate 47 is advantageous in that the radially outer sections of the support plate carrying tool accommodations 48 and retainer fingers 50, 65 are free and locking bolts 69 are provided in the base portion of the respective support plate 47.

Figure 7:
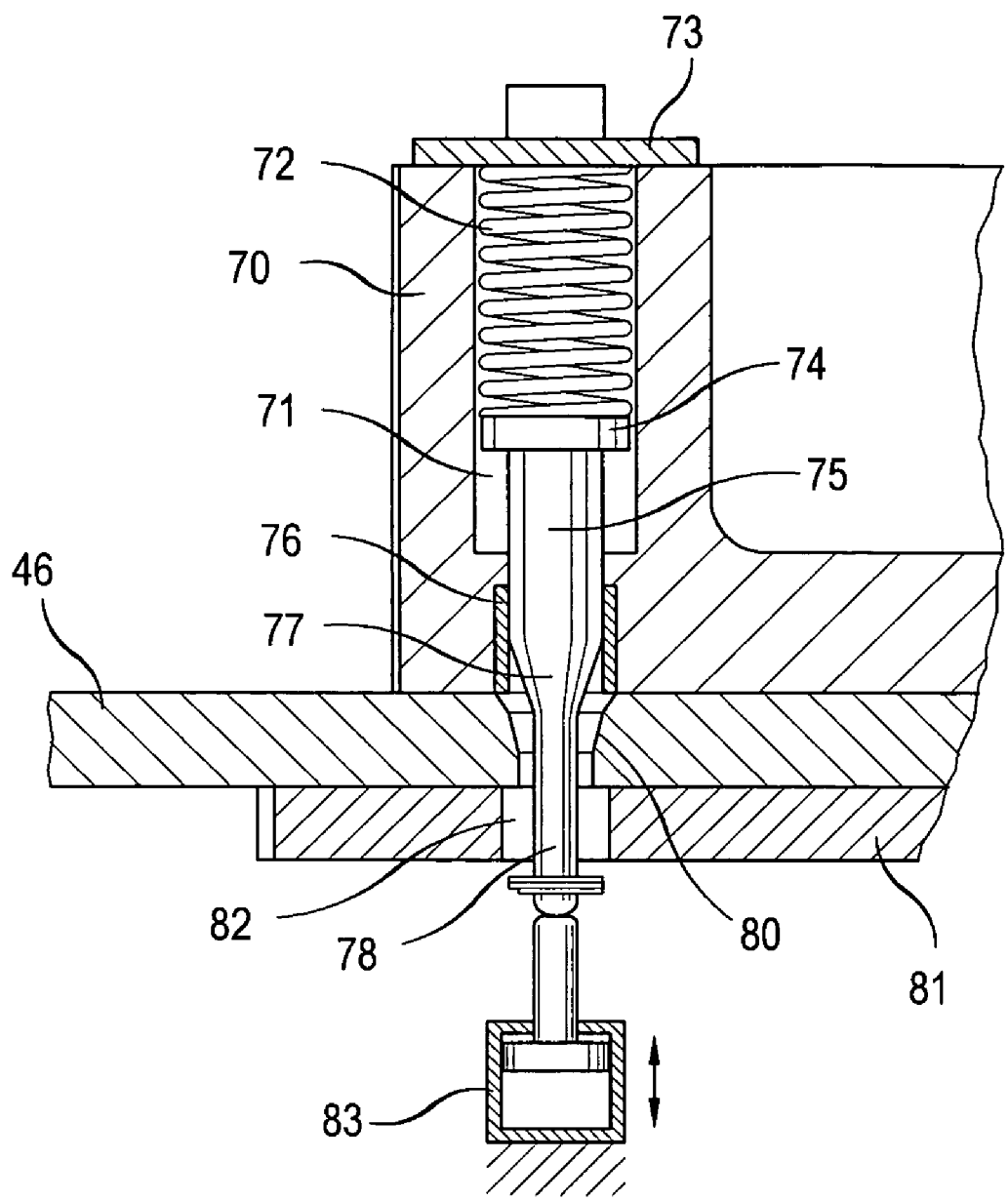
FIG. 7 is a cross sectional view of an embodiment of a locking member with an operating mechanism for the gripping and holding device according to the invention.

FIG. 7 shows the tool exchange or operating area in the encircled sections A of FIGS. 3 and 4 for the chain and the disk magazine. Top assembly 70 is mounted on support plate 46. In cylindrical inner space 71 of the top assembly is pressure spring 72. The pressure spring is, on the one hand, supported by cover plate 73 and, on the other hand, by widened head 74 of locking bolt 75. The thicker part of the shaft of locking bolt 75 is guided in slide sleeve 76 and comprises an approximately cone-shaped portion 77 terminating in narrow end tappet 78. Widened portion 80 in support plate 46 is funnel-shaped in correspondence with cone-shaped bolt section 77. Below support plate 46 is support plate 81 having bore 82 through which passes narrow bolt tappet 78. The crowned end of bolt tappet 78 is supported by the front side of member 83 mounted on a stationary component of the disk magazine and executing vertical movements in the direction of the double arrow driven by drive appropriate and known mechanisms (not shown). The drive mechanisms may comprise hydraulic, pneumatic, electromagnetic, or mechanical actuator elements.

The disk magazines described above may be occupied by a predetermined number of different tools in the conventional way. To insert a certain tool into a tool accommodation predetermined by a processing program, locking member 75 is shifted to the raised position shown in FIG. 7 from its usual locked position by a vertical movement of actuator 83. In that position of the locking member, the tool cone of the selected tool can be inserted into the accommodation orifice transverse to its longitudinal axis, the now spring-resilient retainer finger being elastically displaced and returning to its original position while clamping the tool cone or its ring-shaped collar. Thereafter, locking member 75 is returned by the force of pressure spring 72, whereby its cone-shaped portion 77 is pushed into the cone-shaped portion of recess 80. The shape of the recess corresponds to the shapes of the widened portions 55 and 68 shown in FIGS. 5 and 6. In this position of locking member 75 the action of spring element 53 of FIG. 5 or 63 of FIG. 6 is cancelled, and the displaceable retainer finger 51 or 65 is locked in its clamping position. The clamped tool is therefore securely surrounded and secured so that the magazine disk may be rotated with a high starting acceleration.

If a certain tool is to be inserted into the work spindle the magazine disk is rotated so that the respective tool accommodation containing the specific tool is moved into the predetermined transfer position. During the rotation the locking members of all tool accommodations are located in their locked positions, and the displaceable retainer fingers are rigid. When the selected tool accommodation arrives in the transfer position locking member 75 is moved into its non-locked position by an actuator mechanism (see FIG. 7), whereby the one retainer finger becomes resiliently displaceable. The gripper of the respective tool changing device can grip the tool cone with a horizontal accessing movement and laterally draw it out of the tool accommodation while resiliently displacing the retainer finger. The retainer finger then returns to its original position, and the locking member is pushed back into its locked position by the spring.

The embodiment of an operating mechanism of the locking bolt shown in FIG. 7 may also be used for a gripping and holding device according to FIG. 1 for operating locking member 8. With cone-shaped portion 77 of locking bolt 75 and corresponding cone-shaped widened orifice 80 a deadlock of the locking bolt can be prevented. The operating mechanism or the locking bolt and the associated accommodation orifice may be formed so that the locking bolt generates a closing force in the displaceable retainer finger in its locked position which grants a safe engagement of the tool holder without any clearance.

FIGS. 8 and 9 respectively show two links of chain magazines the remaining components of which, particularly the support frame structure, the guide rails, etc., are generally known. One of such chain magazines is shown in FIG. 3. Such chain magazines are generally used when a larger number of processing tools are required and only limited space is available in the proximity of the associated milling and drilling machine. Each chain link is provided with a gripping and holding device according to the invention for accommodating and holding a tool.

FIG. 8 shows two identical chain links 85*a*, 85*b* which are separated from each other. Lower chain link 85*b* is sectioned in the plane of the central axes of its joint bolts. On the front side of each chain link 85*a*, 85*b*, rigid support plate 86*a*, 86*b* is securely mounted by means of a plurality of screws. These support plates are preferably made of steel of a relatively high quality. The two support plates correspond to the plate-shaped support elements described above in their design and function. Each support plate 86*a*, 86*b* is respectively provided with two integrally formed retainer fingers 87, 88 surrounding more than a semicircular portion of an accommodation orifice for the standardized tool holder of a processing tool. As in the embodiments described above, one retainer finger 87 is inherently stable and rigid, and the other retainer finger 88 is resiliently displaceable so that a tool holder may be inserted into and removed from the accommodation orifice 90 while the retainer finger 88 is extended.

In each support plate 86*a*, 86*b*, a slot 89 is provided which terminates the elongated displaceable retainer finger 88 toward the massive large-surface part of the support plate and is laterally opened to the accommodation orifice. Slot 89 extends parallel to the lateral edge of displaceable retainer finger 88 in a larger, straight portion 89*a* and in an arcuate section in the rear base portion of the support plate. The other end of slot 89 terminates in circular recess 89*c* in the base portion of the support plate. According to the present embodiment slot 89 defines resilient bridge 91 over its entire length which comprises a longer, straight portion as well as an arcuate base section in accordance with the shape of slot 89. The width, and thus the cross section of resilient bridge 91, are approximately constant. Resilient bridge 91 has a considerable length and therefore a relatively soft spring characteristic. By changing the thickness of the resilient bridge continuously or in one or two portions in the longitudinal direction the spring characteristic may be changed and adjusted to corresponding practical requirements, for example, the weight of the respective tools.

In the embodiments shown in FIGS. 8 and 9, the free end portion of resiliently displaceable retainer finger 88 is also provided with nose 92 having a crowned shape and protruding radially inwardly into recess 90. Nose 92 is an operating element for the displaceable retainer finger 88 since the tool holder pushes the nose aside during the insertion or extraction and therefore resiliently displaces retainer finger 88. Just as in the other embodiments, two retainer fingers 87, 88 extend beyond the maximum diameter of the clamped tool holder. Correspondingly, nose 92 has a clamping function in the locked state.

As can be seen in the upper portion of FIG. 8, resiliently displaceable retainer finger 89*a* extends beyond the extension of joint ligaments 93 of chain links 85*a*, 85*b*. Each displaceable retainer finger 89*a* is provided with a respective bore 94 for accommodating locking member 95 formed as a cone-shaped head at the end of longitudinally adjustable rod 96 in its broader end portion 89*d*. Rod 96 extends through joint bolt 93, which bolt is formed as a hollow tappet and carries actuator mechanism 97 on its end portion protruding from chain link 85*a*, 85*b*. For axially shifting rod 96 within hollow tappet 93, actuator mechanism 97 comprises a helical spring 98 surrounding the end portion of rod 96 and pressurized air cylinder 99 acting in the direction opposed to the spring force and mounted on a stationary component of the magazine structure. The force of helical spring 98 keeps rod 96 in the locked position in which its head on its distal end is positively engaged in bore 94 of displaceable retainer finger 88 without any clearance and secures it in its locked position. For obtaining a secure zero-backlash engagement, locking head 95, as well as bore 94, should have matched cone-shaped side walls. To release the locked state, pressurized air is supplied to cylinder 99 whereby rod 96 is shifted until a sufficient clearance enabling a sufficient displacement of the retainer finger is formed between the walls of the bore and cone-shaped head 95.

Chain links 85*a*, 85*b* of the magazine chain shown in FIG. 8 comprise a central part 100 having a partly cylindrical inner surface. On one side of large surface center portion 100 a rigid central bridge 101 is formed, and on the opposite side two spaced, also rigid bridges 102, 103 are formed. In the assembled state central bridge 101 is engaged in the space defined by bridges 102, 103 of the adjacent chain link. The end portion of each of bridges 101, 102, 103 is provided with a respective transverse bore 104, 105, 106 through each of which joint bolt 93 extends as shown in a cross sectional view in the lower part of FIG. 8.

For guiding the magazine chain of the chain magazine shown in FIG. 8 along a stationary metal rail (not shown) of the support structure, plastic blocks 107 are attached to the end surfaces of central bridges 101 of chain links 85*a*, 85*b*, for example, by means of countersunk screws or other suitable means.

Two chain links of another chain magazine embodiment are shown in FIG. 9. These links correspond to the chain links according to FIG. 8. Therefore identical components are designated by the same reference numerals. Only the support plates comprising the retainer fingers formed thereon differ in the two embodiments. Like the support members according to the other embodiments, support plates 110*a*, 110*b* of the chain magazine shown in FIG. 9 consist preferably of a steel of a relatively high quality and have a sufficient thickness to hold even heavier tools. On each support plate 110*a*, 110*b* a bending-rigid retainer finger 111 and a resiliently displaceable retainer finger 112 are formed, respectively, which therefore both consist of parts of the steel plate. Both retainer fingers 111, 112 define an accommodation orifice in the shape of a circle segment for clamping a tool 113, 114. The angular range enclosed by the retainer fingers 111, 112 is larger than 180° which, in principle, also applies to the other embodiments of the gripping and holding device according to the invention.

As can be seen in FIG. 9 the resiliently displaceable retainer fingers 112 are integrally connected to straight resilient bridge 115 which, in this example, has a constant width and is defined by slot 116. Resilient bridge 115 is integrally connected to parallel bridge portion 117 via arcuate portion 118. Bridge portion 117 is connected to base portion 119 of support plate 110*a*, 110*b*. In this embodiment as well the free end of resiliently displaceable retainer finger 112 is provided with crowned nose 120 protruding to the inner side.

The shape and width as well as the distance between the retainer fingers of the chain, shelf, and disk magazines should be selected so that the end portions of the retainer fingers form mutual stoppers to limit the maximum spreading of the resiliently displaceable retainer finger.

In the gripping and holding device according to the invention all locking members are continuously held in their locked positions by a resilient force or by other suitable means such as positive latching or a frictional interlock so that all the tools present in the magazine or in the gripper are fixedly secured. Only for the exchange operation the locked state is temporarily interrupted by shifting a particular locking member so that the tool cone of a particular tool can be extracted from or inserted into the accommodation by resiliently extending the resiliently displaceable retainer finger. The operating mechanism and the associated actuator for the locking member are therefore only provided in the proximity of the respective transfer station of the disk or shelf magazine. An individual drive for the operating mechanism, for example, a pressure cylinder, is not required in every case. The operation of the locking member may also be derived from the movement of the gripper or the magazine, or both.

The invention is not limited to the embodiments shown. For example, a different number and a different course of the slots produced, for example, by milling or laser cutting, may be selected. A significant feature is that the support member is provided with at least one integrated resilient portion functionally connected to the displaceable retainer finger and that a resilient displacement of the integrally formed resilient portion can be prevented by closing a predetermined slot portion. Instead of locking bolts 55, 75 described above, different types of locking members which may, for example, be operated by shifting or rotating and held or locked in their locked position by suitable means, may be used to close the resilient portion.

What is claimed is:

1. A device for gripping and holding a component in the handling system of a machine tool, the device comprising:
   at least one support member;
   at least two retainer fingers on said at least one support member;
   bias means urging said at least two retainer fingers to a clamping position, said at least two retainer fingers being spreadable against the return force of said bias means, said at least two retainer fingers being shaped and configured to define a common accommodation orifice to receive the component to be clamped;
   at least one of said at least two retainer fingers being integrally formed with said at least one support member and being resiliently displaceable with respect to the other of said at least two retainer fingers; and
   a locking element shaped and configured to lock said at least one of said at least two retainer fingers in the clamping position.

2. The device according to claim 1, wherein said at least one support member is a rigid support plate, said support plate being integrally formed with said at least two retainer fingers.

3. The device according to claim 2, wherein said at least one support member comprises an elongated slot and a resilient bridge defining said at least one displaceable retainer finger.

4. The device according to claim 1, wherein said at least one support member comprises an elongated slot and a resilient bridge defining said at least one displaceable retainer finger.

5. The device according to claim 4, wherein said locking element is shaped and configured to lock said at least one displaceable retainer finger by direct action.

6. The device according to claim 1, wherein said at least one support member has a base portion and comprises at least two adjacent slots extending from its base portion, said slots defining a bridge which is connected to one of the retainer fingers, said bridge comprising said bias means.

7. The device according to claim 6, wherein said at least one support member is formed with least one transverse slot configured to receive at least one said locking element.

8. The device according to claim 6, wherein at least one of the slots comprises a transverse widened section for receiving said locking element.

9. The device according to claim 6, wherein said accommodation orifice is more than semicircular and is open on one side and shaped to receive a component, at least one of said slots, starting at the base portion of said support member, terminates in said accommodation orifice.

10. The device according to claim 1, wherein said locking element is a longitudinally or transversely adjustable locking bolt having a round, oval or angular cross section and comprising a cone-shaped section.

11. The device according to claim 1, wherein said locking element can be shifted or rotated into an inactive position from its locked position.

12. The device according to claim 1, and further comprising an operating mechanism coupled to said locking element.

13. A tool magazine of a machine tool comprising a plurality of tool accommodations, the tool accommodations comprising gripping and holding devices according to claim 1.

14. The tool magazine according to claim 13, wherein said tool magazine comprises a disk magazine, wherein said at least one support member comprises at least one plate-like support member forming a rotationally driven magazine disk on the outer circumference of which the tool accommodations are provided, wherein said at least two retainer fingers comprise one rigid and one resiliently displaceable retainer finger lockable in its clamping position.

15. The tool magazine according to claim 13, wherein said tool magazine comprises a chain magazine having chain links, wherein said at least one support member comprises at least one plate-like support member respectively comprising at least one of the resiliently displaceable retainer fingers, said at least one resiliently displaceable retainer finger being lockable in its clamping position by means of said locking element, said locking element being on said chain links.

16. The chain magazine according to claim 15, wherein said at least one resiliently displaceable retainer finger is connected to a resilient bridge laterally defined by a slot.

17. The chain magazine according to claim 16, wherein said locking element engages with an orifice in the end of said at least one resiliently displaceable retainer finger.

18. The chain magazine according to claim 16, and wherein said at least two retainer fingers include a rigid retainer finger of a respective said tool accommodation which forms a stopper for the spreading of said at least one displaceable retainer finger of an adjacent gripping and holding device.

19. The chain magazine according to claim 15, wherein said locking element is adjustable and is a part of a chain joint.

* * * * *